US007409465B2

(12) United States Patent
Vimpari

(10) Patent No.: US 7,409,465 B2
(45) Date of Patent: Aug. 5, 2008

(54) NETWORK-NETWORK INTERFACE FOR INTER-OPERATOR SERVICE

(75) Inventor: Markku Vimpari, Oulu (FI)

(73) Assignee: Nokia Corporation, Espoo (FI)

(*) Notice: Subject to any disclaimer, the term of this patent is extended or adjusted under 35 U.S.C. 154(b) by 945 days.

(21) Appl. No.: 10/769,846

(22) Filed: Feb. 3, 2004

(65) Prior Publication Data

US 2005/0114525 A1  May 26, 2005

(30) Foreign Application Priority Data

Nov. 25, 2003  (EP)  ................................... 03027100

(51) Int. Cl.
G06F 15/16 (2006.01)
G06F 12/00 (2006.01)
(52) U.S. Cl. ...................... 709/250; 709/238
(58) Field of Classification Search ................ 709/203, 709/223, 238, 250
See application file for complete search history.

(56) References Cited

U.S. PATENT DOCUMENTS

2001/0047414 A1* 11/2001 Yoon et al. .................. 709/225
2002/0024946 A1* 2/2002 Jeong et al. ................. 370/352
2002/0052915 A1* 5/2002 Amin-Salehi ............... 709/203
2002/0087721 A1* 7/2002 Sato et al. ................... 709/238
2002/0122416 A1* 9/2002 Xu et al. ..................... 370/352
2003/0093563 A1  5/2003 Young
2003/0154306 A1* 8/2003 Perry ......................... 709/245
2003/0172142 A1* 9/2003 Su ............................. 709/223
2003/0179775 A1* 9/2003 Carolan et al. .............. 370/469
2003/0191848 A1* 10/2003 Hesselink et al. ........... 709/229
2004/0076180 A1* 4/2004 Satapati et al. .............. 370/467

OTHER PUBLICATIONS

A. Simu et al., Cisco Systems, Inc., "STUN-aware NAT draft-simu-midcom-stun-aware-nat-00.txt", Internet-Draft, Apr. 10, 2002, pp. 1-17.
J. Rosenberg et al., "NAT and Firewall Scenarios and Solutions for SIP", Internet Draft, Jun. 24, 2002, pp. 1-58.

* cited by examiner

Primary Examiner—Zarni Maung
(74) Attorney, Agent, or Firm—Squire, Sanders & Dempsey L.L.P.

(57) ABSTRACT

The invention describes serving, on application level, services between IP networks supporting addresses which require translation, wherein a service is processed between a common address space common to IP networks and a specific address space specific to an IP network via a first interface which is accessible from the specific address space and a second interface which is accessible from the common address space.

14 Claims, 7 Drawing Sheets

NETWORK-NETWORK INTERFACE FOR INTER-OPERATOR SERVICE

FIELD OF THE INVENTION

The present invention generally relates to IP (Internet Protocol) networks. In particular, the invention relates to an IP based inter-operator service such as PoC (Push-to-talk over Cellular).

BACKGROUND OF THE INVENTION

IPv6 (IP version 6) has been presented as main enabling technology for providing IP based inter-operator services. Ipv6 is the universal solution for that, but in short term also IPv4 (IP version 4) solutions may be needed. In case IPv4 is used, the problem is that when using SIP (Session Initiation Protocol), NATs (Network Address Translators) are required and they cause serious problems for services like PoC using UDP (User Datagram Protocol) data streams for media.

FIG. 6 shows a typical IPv4 networks arrangement. A server in an operator's network is given an IPv4 address from an operator's public address space. For example, a server in a first operator's network is given a public IPv4 address 3, and a server in a second operator's network is given a public IPv4 address 4. Clients, e.g. mobiles, are assigned dynamic private IPv4 addresses as shown in FIG. 6. Thus, the clients are able to contact any server in their own network and in other networks having a server with a public IPv4 address and servers with public IPv4 addresses can contact each other unless restricted by firewalls.

However, since an NAT is required for translating the public address space into the private address space and vice versa, no inter-operator direct mobile-to-mobile IP connections are possible. In addition, the server cannot send any data to the clients, because the IP addresses reported in the SIP messages are from an unroutable address space.

FIG. 7 illustrates the operation of an NAT. For HTTP (HyperText Transfer Protocol) traffic all computers send traffic to a public IPv4 address 3 and a TCP (Transport Control Protocol) port number 80, for example. For the source ports an NAT in a router with a public IPv4 address 1 receiving traffic from the HTTP server assigns new random port numbers and keeps also a mapping table on the assigned IP address/port relationships. In this way, a big number of users can use the same public IP address.

In case TCP is used there are sessions which are always opened and closed. Thus, the NAT knows that when the TCP session is closed the public port number does not have to be reserved anymore and can be assigned to a new private IP address user. However, with UDP there are no sessions. As a result, in the NATs there is typically an inactivity timer, and if a public UDP port has not been used during the length of this time, e.g. 40 seconds, the port will be assigned to a new user. Therefore, there is a problem with NATs for services using UDP data streams for media.

It is known that IPv6 makes obsolete NATs and problems related to them. It is also known to have application level intelligence on NATs. However, this might handle part of the problems caused by NATs, but not all of them. More information thereon can be found in J. Rosenberg et al.: "NAT and Firewall Scenarios and Solutions for SIP", Internet Engineering Task Force, Internet Draft (work in progress), June 2002.

SUMMARY OF THE INVENTION

One object of the present invention is to solve the above problems and to improve processing of inter-operator services.

According to one embodiment of the present invention, a network device serving, on an application level, services between Internet Protocol (IP) networks supporting addresses which require translation is disclosed. The network device includes a first interface, which is accessible from a specific address space specific to an IP network, a second interface, which is accessible from a common address space common to the IP networks and processing means for processing a service between the common address space and the specific address space via the first and second interfaces.

The network device may include at least one further interface, which is accessible from a different address space different from the specific and common address spaces, where the processing means are arranged to process a service between address spaces via two of the interfaces which are accessible from the address spaces respectively. Additionally, the network device may include detecting means for detecting a request for a service to be served by the network device via two of the interfaces, where the processing means are arranged to process data associated with the detected service request between address spaces respectively accessible by the two of the interfaces via which the service is to be served.

Additionally, the network device may be a Push-to-talk over Cellular (PoC) server. The first interface may have at least one address of the specific address space and the second interface has at least one address of the common address space. Also, a network system may include at least one network device, as discussed above, for each IP network of the IP networks having a different specific address space.

Moreover, the invention can be implemented as computer program product, which can be supplied to a processor which is able to process the computer program product.

DESCRIPTION OF THE PREFERRED EMBODIMENTS

As mentioned above there are problems with NATs for inter-operator services. PoC is one of such inter-operator services for which NATs are a problem. PoC offers a direct one-to-one or one-to-many voice service to its users. According to PoC using an 'always-on' connection, calls can be started with just a push of a key. The call connection is almost instantaneous and the receiver is not required to answer the call. For more details about PoC it is referred to the Internet articles "Open standards push-2-talk specification published", cellular-news.com, Sep. 11, 2003, and "Push to Talk", nokia.com, Feb. 17, 2003.

Figure 1:
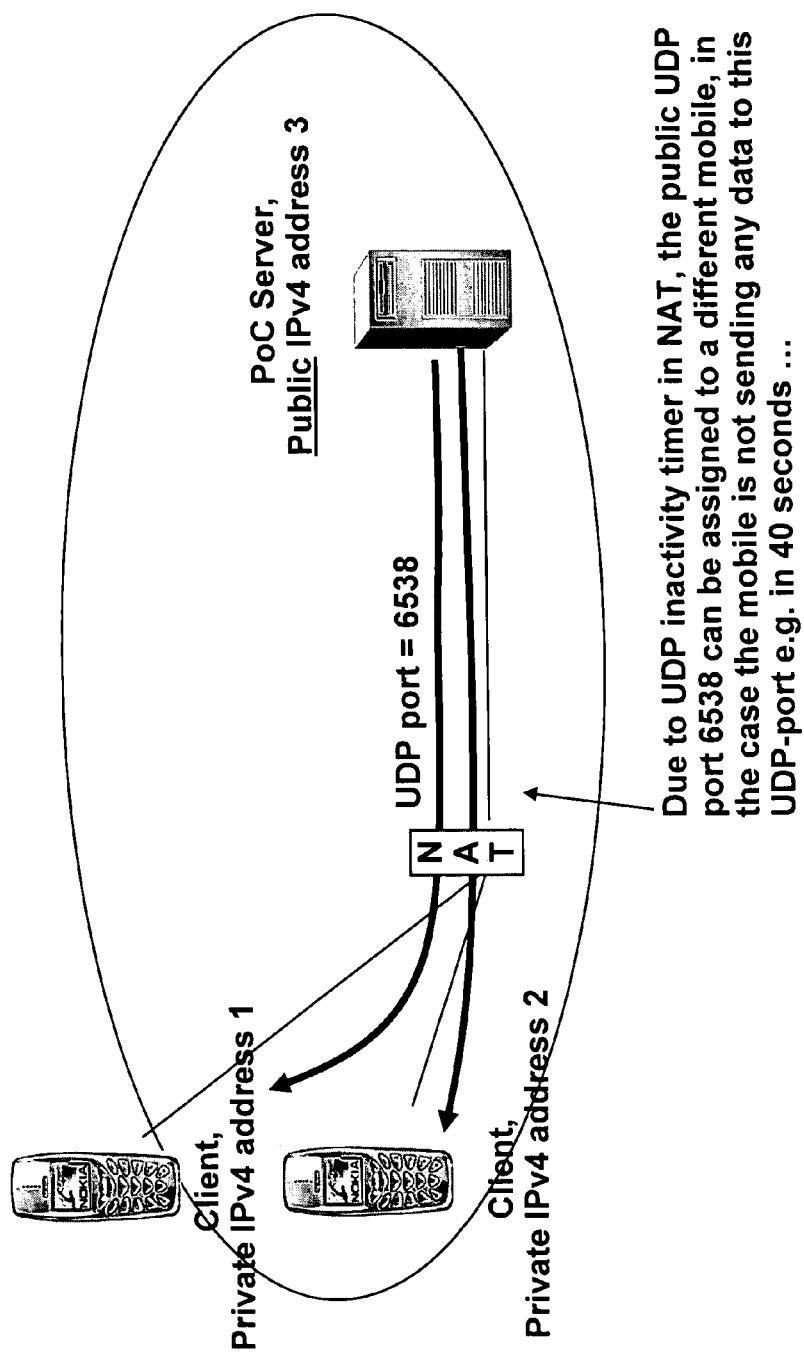
FIG. 1 shows a network arrangement illustrating service connections and NATs.

FIG. 1 shows a network structure for PoC connections comprising NATs. A PoC server has a public IPv4 address 3, and clients have private IPv4 addresses according to the operator's network they belong to. Data to be transferred between the clients and the PoC server have to be submitted via an NAT since address translation between the private and public address spaces is needed.

The PoC voice streaming uses UDP. Due to an inactivity timer in the NAT as mentioned above a public UDP port 6538 can be assigned to a different client in case the client does not send any data to this UDP port e.g. within 40 seconds. Therefore, the client would be required to send packets to every used public UDP socket e.g. every 30 seconds. This would generate unnecessary extra 'overhead' traffic and would consume a lot of battery power. However, in case the client would not send the battery consuming periodical refreshments, the NAT would reallocate the public UDP ports after the expiry of the inactivity timer. This would very easily lead to situations in which the voice streams would be routed to wrong clients or the NAT would be unable to route the packets due to the fact that the mapping from the private IP addresses to the public UDP ports has expired.

Figure 2:
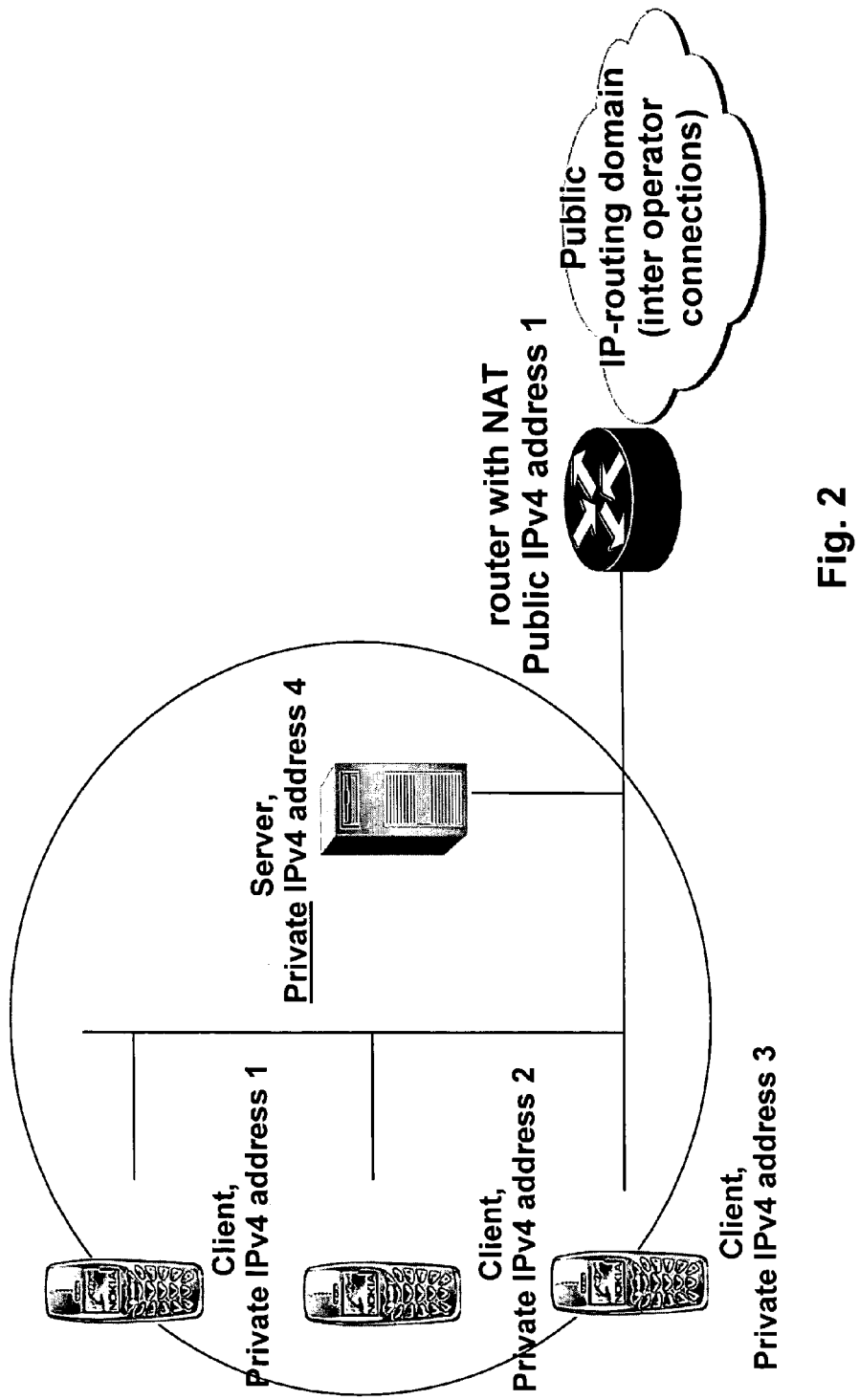
FIG. 2 shows a network arrangement illustrating a server having a private IP address.

FIG. 2 shows a network arrangement with a server having a private IP address 4. A router with a NAT for inter-operator connections is located between the server and the public routing domain. With this arrangement, the server can be contacted by the clients inside the private address space. However, any clients or servers on the other side of the NAT, i.e. on the side of the public routing domain, are not able to contact this server. As a result, servers are typically allocated public IP addresses.

Figure 3:
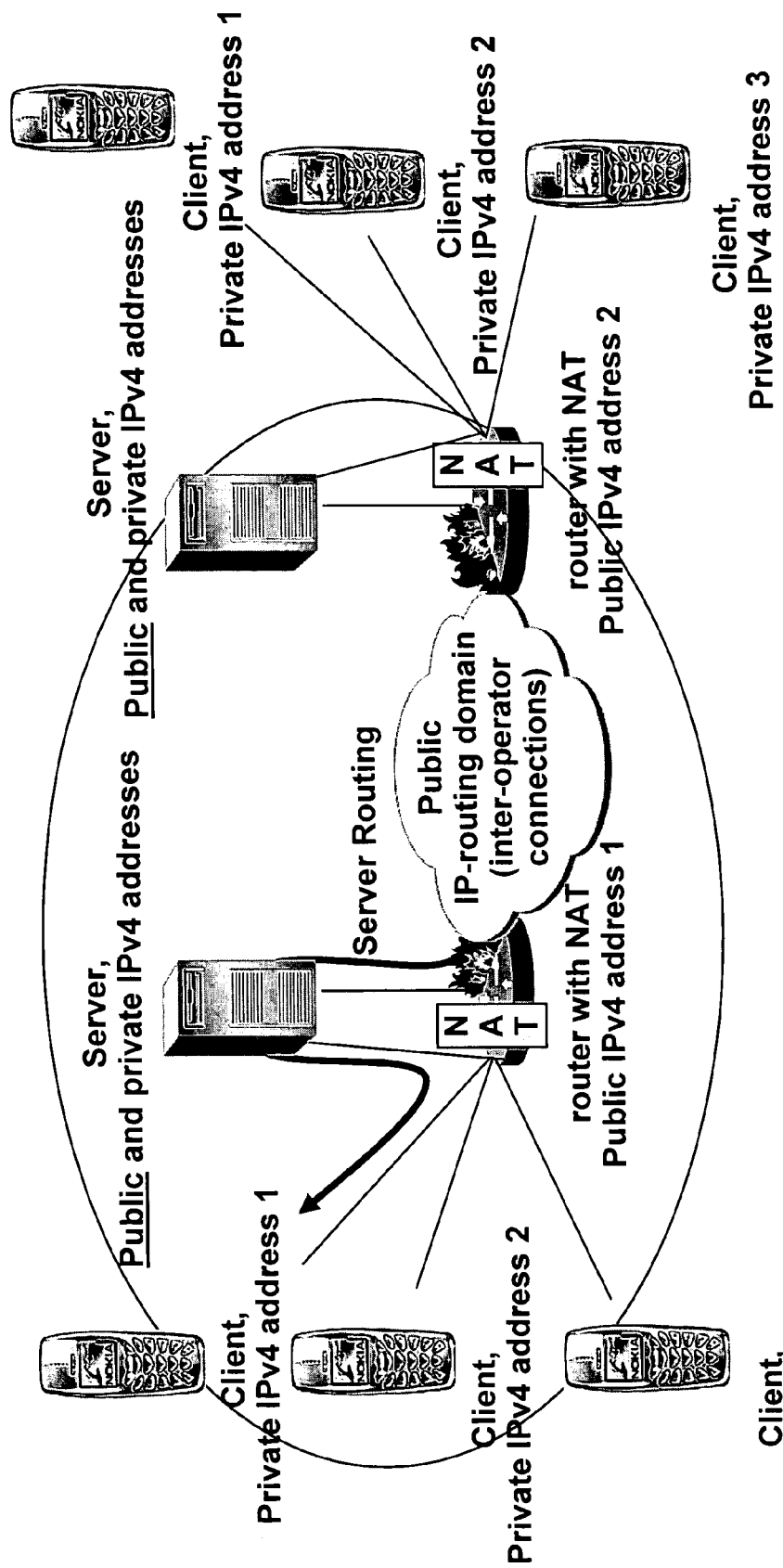
FIG. 3 shows a network arrangement according to the present invention.

For solving the above problems with NATs, according to the invention a server is proposed which has an interface to the public address space and an interface to the private address space. FIG. 3 shows this network arrangement.

According to FIG. 3, the server has an intranet interface with the addresses of the intranet or operator's network comprising a private address space, e.g. private IPv4 address 1 to 3 dynamically assigned to the clients belonging to the operator's network. In addition, the server has an internet interface with the address of the public IP routing domain.

For example, the server is a PoC server, and according to the invention a possible existing NAT between the PoC internet and intranet is not used for the PoC service, but instead the PoC server itself acts as an application level gateway which bypasses the NAT using the intranet and internet interfaces. Thus, the PoC server acts as an application level gateway across the NAT, not at IP level as the NAT. In practice this means that e.g. in the SIP messages the addresses shown in the SIP SDP (Session Description Protocol) are from the same address space. The PoC server comprises both SIP proxy and media server. Moreover, a control and user plane PoC server connected to the public internet also has an intranet network interface.

Referring back to FIG. 3, the servers are given at least one IPv4 address from the operator's public address space and at least one private address. The clients or mobiles are assigned dynamic private IPv4 addresses. With this network arrangement, the clients can contact any server and the servers can contact each other unless restricted by firewalls. Moreover, inter-operator mobile-to-mobile IP connections are possible via the server having both public and intranet address interfaces. For example, the server serves PoC and, thus, represents a PoC edge server.

As described above, with the invention IPv4 inter-operator PoC connections are enabled without the problems caused by the usage of NATs.

Figure 4:
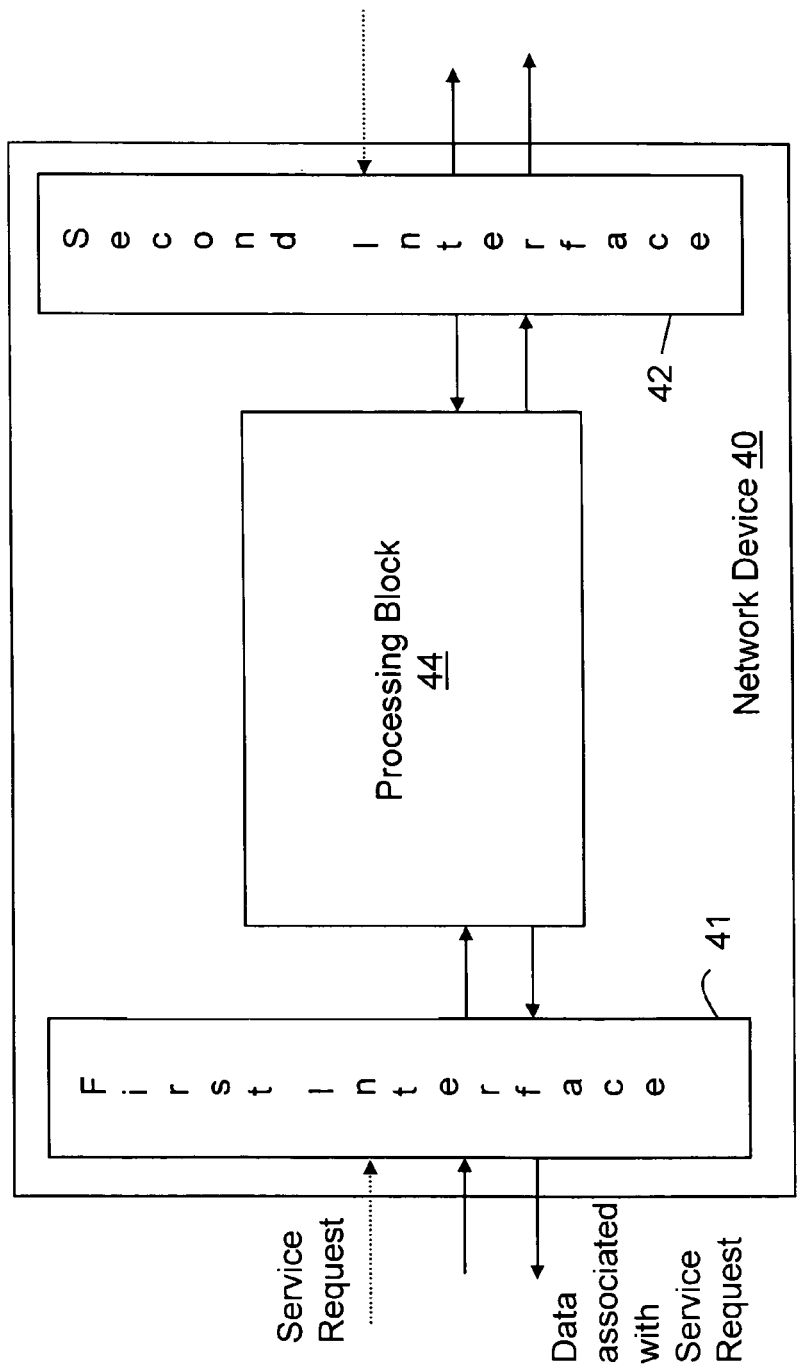
FIG. 4 shows a schematic block diagram illustrating elements of a network device according to the invention.

In particular, as shown in FIG. 4, a network device 40 such as a PoC server is provided which serves, on application level, services between IP networks supporting addresses which require translation e.g. from a public address space into a private address space and vice versa.

The network device 40 comprises a first interface 41 which is accessible from a specific address space specific to an IP network, such as a private address space. In addition, the network device comprises a second interface 42 which is accessible from a common address space common to IP networks, such as a public address space. Moreover, the network device comprises a processing block 44 for processing a service between the common address space and the specific address space via the first and second interfaces.

Moreover, the network device 40 may comprise even more interfaces (not shown) which are accessible from an address space different from the first specific and common address spaces. The processing block 44 may process a service between address spaces via the respective interfaces which are accessible from the address spaces.

Figure 5:
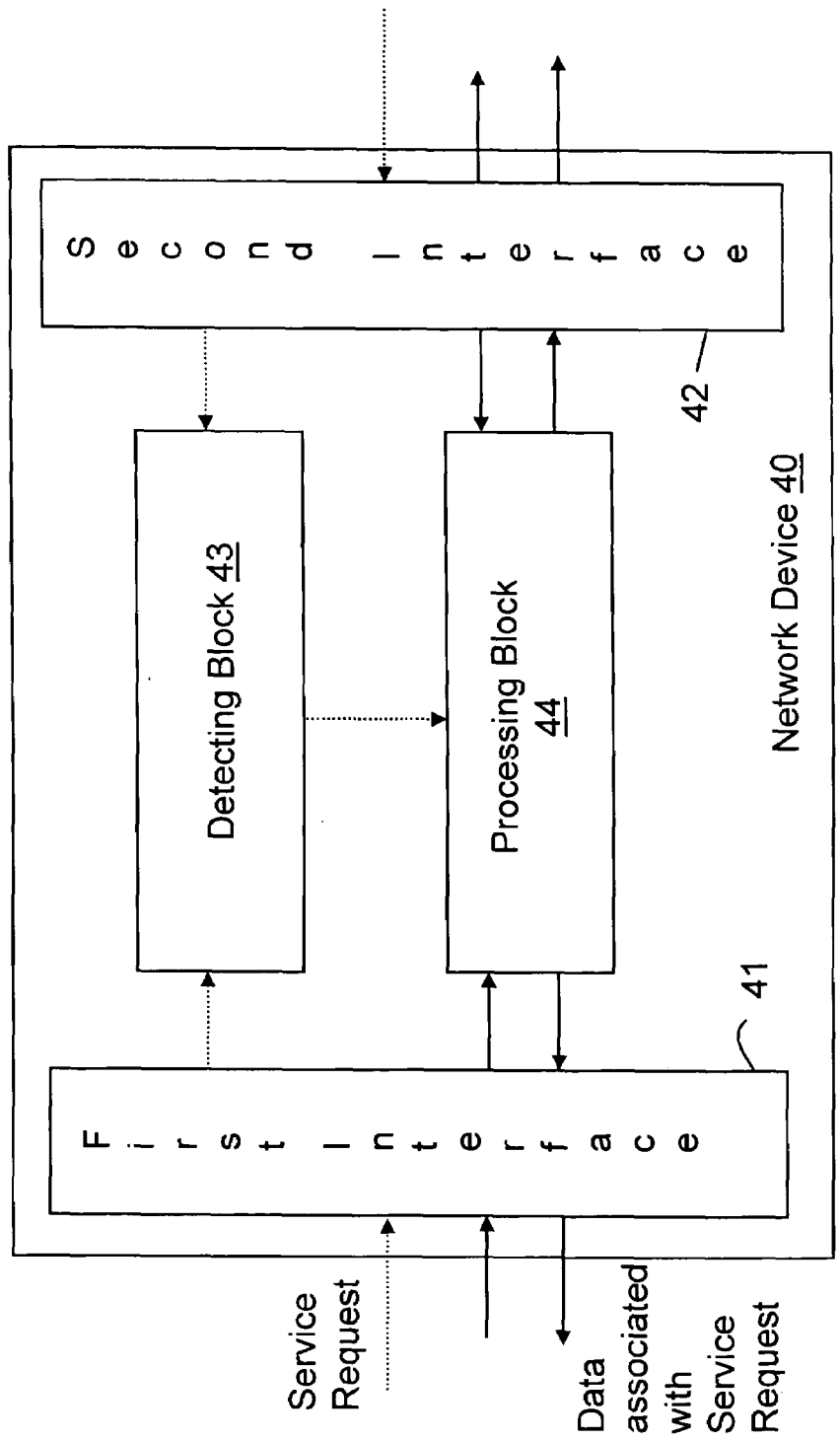
FIG. 5 shows a schematic block diagram illustrating elements of a network device according to an embodiment of the invention.
Figure 6:
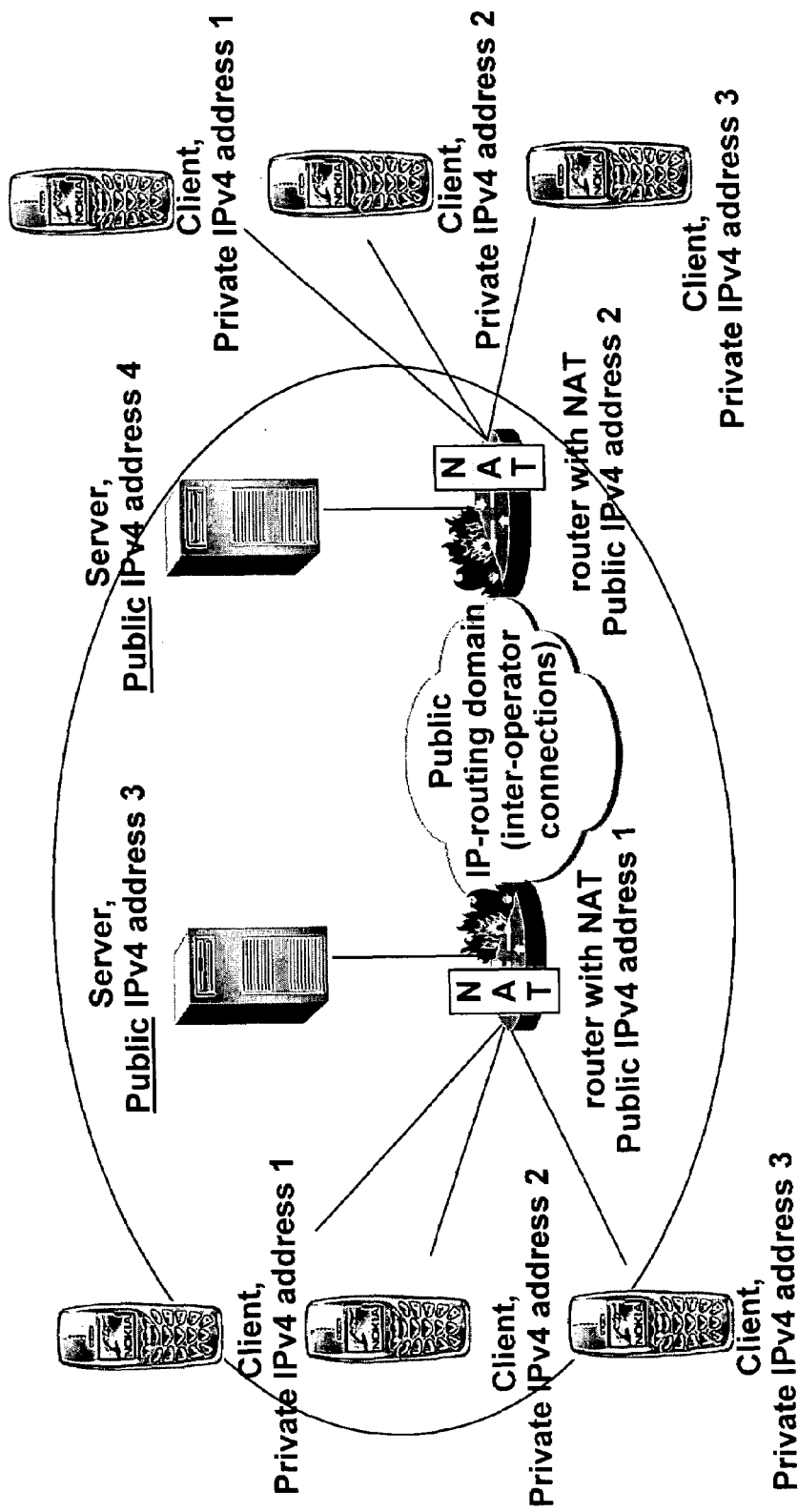
FIG. 6 shows a network arrangement illustrating an operation of an NAT.
Figure 7:
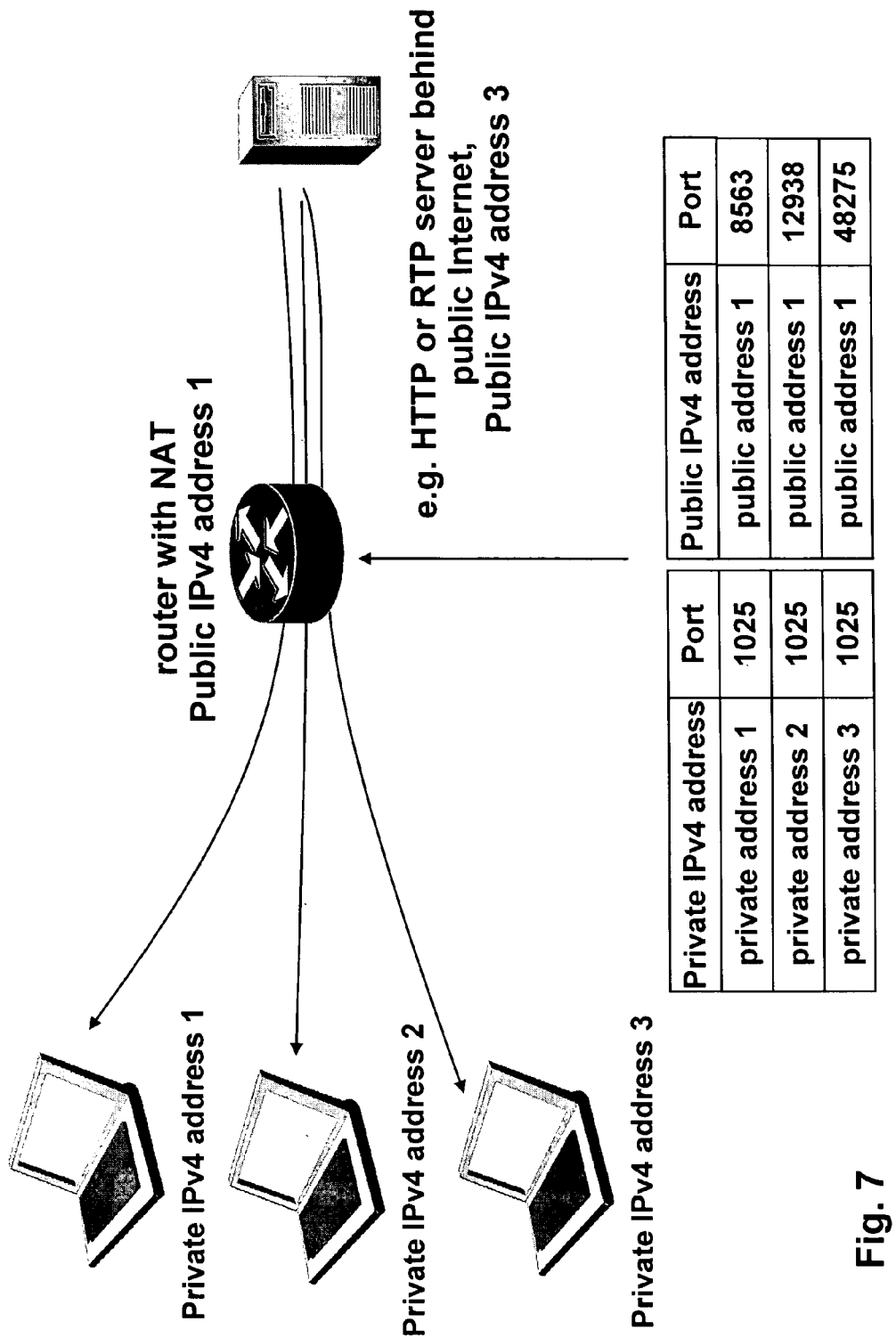
FIG. 7 shows a network arrangement according to the prior art.

As shown in FIG. 5, the network device 40 may further comprise a detecting block 43 for detecting a request for a service to be served by the network device 40 via the first and second interfaces. The detecting block 43 may inform the processing block 44 about the detected service request, and the processing block 44 may process data associated with the detected service request between the common address space and the specific address space via the first and second interfaces. The detecting means 43 may detect a service request on the basis of a local address related to every single SIP message or media packet. The service request may be issued by a client applying the service and having an address of the specific address space.

Furthermore, the detecting block 43 may detect a request for a service to be served by the network device via two of the interfaces. The processing block 44 may process data associated with the detected service request between the address spaces respectively accessible by the two interfaces via which the service is to be served.

Furthermore, the first interface 41 may have at least one address of the specific address space and the second interface 42 may have at least one address of the common address space.

According to the above arrangement of the invention, IPv4 inter-operator PoC connections are allowed without the problems caused by NATs. In other words, a PoC network-to-network interface is provided without the need to deploy IPv6.

Furthermore, in addition to the handling of different address ranges or spaces, according to the present invention even the address family (or network protocol type) may be different, e.g. IPv6 in the intranet or private address space and IPv4 on the Internet or public address space side.

Processing SIP messages in a proper way is not enough, the media address spaces must be handled too. According to the multihost server of the present invention the media can be also taken into account.

It is to be noted that the invention is not restricted to PoC. Rather, any server serving a specific service having problems with NATs can be provided with private and public address space interfaces. In this context, signaling such as SIP signaling is needed to get information about the media addressed on both sides of the NAT in order to bypass the NAT.

Moreover, it is to be noted that the above described concept of the invention applies to even more than two interfaces and network address spaces. For example, the server may comprise interfaces to intranet, internet and extranet (non-trusted intranet, which is not directly connected to corporate or operators own secure intranet).

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
   a first interface, which is accessible from a specific address space specific to an internet protocol network and has at least one address of the specific address space;
   a second interface, which is accessible from a common address space common to internet protocol networks and has at least one address of the common address space; and
   a processor configured to process a service on an application level between the common address space and the specific address space via the first and second interfaces such that the service is served without network address translation at internet protocol level.

2. The apparatus according to claim 1, further comprising:
   at least one further interface, which is accessible from a different address space different from the specific and common address spaces,
   wherein the processor is configured to process a service between address spaces via two of the interfaces which are accessible from the address spaces respectively.

3. The apparatus according to claim 1, further comprising:
   a detector configured to detect a request for a service to be served by the network device via two of the interfaces,
   wherein the processor is configured to process data associated with the detected service request between address spaces respectively accessible by the two of the interfaces via which the service is to be served.

4. The apparatus according to claim 1, wherein the apparatus comprises a Push-to-talk over Cellular server.

5. A system comprising:
   at least one network device for each internet protocol network of a plurality of internet protocol networks, each internet protocol network thereof having a different specific address spaces,
   wherein the at least one network device comprises,
      a first interface, which is accessible from a specific address space specific to the internet protocol network,
      a second interface, which is accessible from a common address space common to the internet protocol networks, and
      a processor configured to process a service on an application level between the common address space and the specific address space via the first and second interfaces such that the service is served without network address translation at internet protocol level.

6. A method comprising:
   processing a service on an application between a common address space, common to internet protocol networks, and a specific address space, specific to an internet protocol network, via a first interface which is accessible from the specific address space and has at least one address of the specific address space and a second interface which is accessible from the common address space and has at least one address of the common address space, such that the service is served without network address translation at IP level.

7. The method according to claim 6, further comprising:
   detecting a request for a service to be served via the first and second interfaces; and
   processing data associated with the detected service request between the common address space and the specific address space via the first and second interfaces.

8. A computer program product embodied on a computer-readable medium, the computer program configured to control a processor to perform operations comprising:
   processing a service on an application level between a common address space, common to internet protocol networks, and a specific address space, specific to an internet protocol network, via a first interface which is accessible from the specific address space and has at least one address of the specific address space and a second interface which is accessible from the common address space and has at least one address of the common address space, such that the service is served without network address translation at internet protocol level.

9. The computer program product according to claim 8, wherein the computer program product is directly loadable into an internal memory of a computer.

10. An apparatus comprising:
    a first interfacing means for providing a first interface from a specific address space specific to an internet protocol network which has at least one address of the specific address space;
    a second interfacing means for providing a second interface from a common address space common to the internet protocol networks, which has at least one address of the common address space; and
    processing means for processing a service on an application level between the common address space and the specific address space via the first and second interface means, such that the service is served without network address translation at internet protocol level.

11. The apparatus network device according to claim 10, further comprising:
    at least one further interface means for providing at least one further interface from a different address space different from the specific and common address spaces,
    wherein the processing means are arranged to process a service between address spaces via two of the interfaces which are accessible from the address spaces respectively.

12. The apparatus network device according to claim 10, further comprising:
    detecting means for detecting a request for a service to be served by the network device via two of the interfaces,
    wherein the processing means are arranged to process data associated with the detected service request between address spaces respectively accessible by the two of the interfaces via which the service is to be served.

13. The apparatus network device according to claim 10, wherein the apparatus comprises a Push-to-talk over Cellular server.

14. A system comprising at least one network device for each internet protocol network of a plurality of internet protocol networks, each internet protocol network thereof having a different specific address space, wherein the at least one network device comprises, a first interfacing means for providing a first interface from a specific address space specific to an internet protocol network, which has at least one address of the specific address space, a second interfacing means for providing a second interface from a common address space common to the internet protocol networks which has at least one address of the common address space, and processing means for processing a service between the common address space and the specific address space via the first and second interface means, such that the service is served without network address translation at internet protocol level.

* * * * *